Aug. 5, 1958  H. H. COLLINS ET AL  2,846,602
BUSHES FOR DYNAMO ELECTRIC MACHINE AND OTHER COMMUTATORS
Filed Aug. 20, 1956

Inventors
H.H.Collins
D.W.Ripper
By Glascock Downing Seebold
Attys

United States Patent Office 2,846,602
Patented Aug. 5, 1958

2,846,602

BUSHES FOR DYNAMO ELECTRIC MACHINE AND OTHER COMMUTATORS

Herbert Henry Collins and David William Ripper, Streetly, England, assignors to Joseph Lucas (Industries) Limited, Birmingham, England Application August 20, 1956, Serial No. 604,929

Claims priority, application Great Britain August 24, 1955

1 Claim. (Cl. 310—235)

A conventional form of commutator for a dynamo electric machine or other like purpose, comprises a plurality of metal bars incorporated with the outer periphery of a cylindrical bush made from electrically insulating plastic material, and a metal bush occupying the interior of the plastic bush, the metal bush serving to support the commutator on a spindle.

The object of the present invention is to provide the metal bush above mentioned in a form which ensures effective bonding thereof to the plastic bush, and which also enables the metal bush to be produced in a convenient manner with economy of material.

A bush in accordance with the invention comprises two metal parts of substantially cylindrical form which are expanded at one end and adapted to be interconnected in a spigot and socket manner to form a collar at the centre of the bush, the other ends of the parts being beaded to form a pair of lands for supporting the bush in a spindle.

Figure 1:
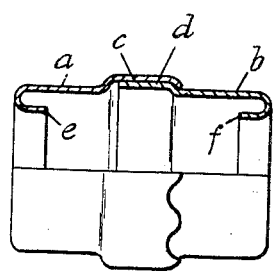
Figure 2:
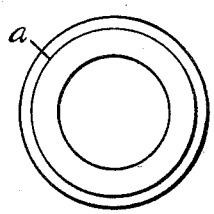
Figure 3:
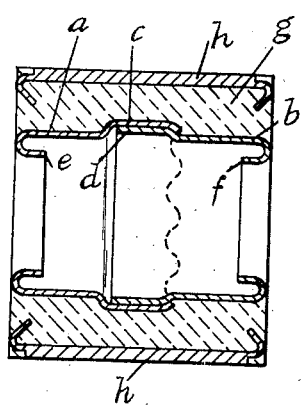

In the accompanying drawings, Figure 1 is a half-sectional side elevation of a bush constructed in accordance with the invention, and Figure 2 is an end view of the bush. Figure 3 is a sectional side elevation of a commutator having incorporated with it a bush as shown in Figures 1 and 2.

Referring to Figures 1 and 2, the parts $a$, $b$, of the bush may be formed from sheet metal by pressing operations, or they may be cut from metal tube, each part being of substantially cylindrical shape. One end of the part is expanded to form a socket $c$, and one end of the part $b$ is expanded to form a spigot $d$ which can tightly fit the socket. After the parts have been placed together to form the required collar, they are secured by turning inwardly the edge of the socket over the shoulder of the spigot, as shown in Figure 1. To prevent accidental rotation of the metal bush within the plastic bush in which the former is subsequently embedded, the outer surface of the collar may be knurled and/or the edge of the socket may be scalloped as shown in the lower part of Figure 1.

Also the outer ends of the parts $a$, $b$, are turned inwardly to form beads $e$, $f$, which serve as lands for supporting the bush on the commutator spindle, the lands being sufficiently flexible to enable them to adapt themselves to spindles of slightly varying diameters.

A metal bush constructed in the manner above described ensures effective bonding of the bush with the plastic bush $g$ of the commutator as shown in Figure 3, the bush $g$ having the usual metal bars $h$ incorporated with it in any convenient manner. Moreover the metal bush can not only be produced by expeditious manufacturing processes, but economy of material can be effected as compared with bushes machined from a bar or tube.

Having thus described our invention what we claim as new and desire to secure by Letters Patent is:

A commutator bush composed of two coaxial and substantially cylindrical parts having expanded adjacent ends interconnected in the manner of a spigot and socket to form an external collar around the centre of the bush, the other ends of the said parts being turned inwardly to form lands for supporting the bush on a spindle.

References Cited in the file of this patent

UNITED STATES PATENTS 1,845,114   Apple _____ Feb. 16, 1932

FOREIGN PATENTS

316   Great Britain _____ of 1907